W. Fox,
Harrow.
No. 113,286. Patented Apr. 4, 1871.
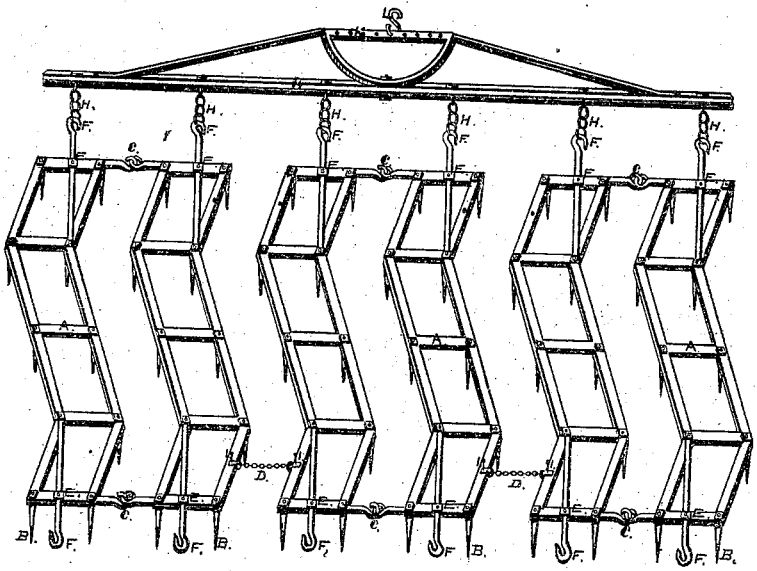
FIG. I.
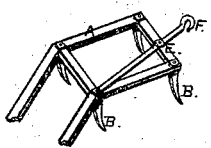
FIG. II.
WITNESS
William Hornor.
A. A. Thomas
INVENTOR.
William Fox
By W. B. Smith
his Attorney 113,286

UNITED STATES PATENT OFFICE.

WILLIAM FOX, OF BEAVER DAM, WISCONSIN.

IMPROVEMENT IN HARROWS.

Specification forming part of Letters Patent No. 113,286, dated April 4, 1871; antedated March 18, 1871.

*To all whom it may concern:*

Be it known that I, WILLIAM FOX, of Beaver Dam, in the county of Dodge and in the State of Wisconsin, have invented certain Improvements in Harrows, of which the following is a specification:

The nature of my invention is to arrange the harrow so that it may cut the ground finer or coarser, as may be desired, and also to draw it either end forward. When one end is forward the teeth will be hooking and draw deeper into the ground than when the other end is forward, for in the latter case the back side or rounding side of the tooth is forward, and it will draw over the ground instead of hooking into it.

Figure I is a perspective view of my invention, and Fig. II is a side view of one end of one of the sections, showing the hook of the tooth.

A is the frame-work; B, the teeth. These teeth are hooking a little. C, a jointed connection between each pairs of the harrow; D, a chain on the rear of each two pairs of the harrow to keep them from spreading; E, bolts on the front end of the harrow through the draft-irons F to hold them firmly to the harrow; F, the draft-iron; G, draft-bar; H, fastenings in the draft-bar to hitch to the draft-irons F; I, pins to fasten the chains D through a clevis on the ends of the chains to the frames A; K, draft-clevis; L, hook hooking into the draft-clevis to haul the harrow by.

The object of this harrow is to have it pull the teeth deeper into the earth when pulled one end forward, and to run lighter the other end forward, pulling against the back of the teeth.

I claim as my invention—

A harrow made in pairs, with joints C to hold the pairs together, the chains D to hold the hind ends together, with draft-irons F at either end so as to haul it in either direction.

WILLIAM FOX.

Witnesses:
   H. W. LANDER,
   ALFRED SWAN.